United States Patent
Hetherington et al.

(10) Patent No.: US 9,736,611 B2
(45) Date of Patent: *Aug. 15, 2017

(54) ENHANCED SPATIALIZATION SYSTEM

(71) Applicant: 2236008 Ontario, Inc., Waterloo (CA)

(72) Inventors: Phillip A. Hetherington, Port Moody (CA); Mark Fallat, Vancouver (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 77 days.

This patent is subject to a terminal disclaimer.

(21) Appl. No.: 14/689,558

(22) Filed: Apr. 17, 2015

(65) Prior Publication Data

US 2015/0223003 A1      Aug. 6, 2015

Related U.S. Application Data

(63) Continuation of application No. 13/020,954, filed on Feb. 4, 2011, now Pat. No. 9,036,843.

(Continued)

(51) Int. Cl.
*H04R 5/00* (2006.01)
*H04S 7/00* (2006.01)
(Continued)

(52) U.S. Cl.
CPC .............. *H04S 7/30* (2013.01); *H04M 3/568* (2013.01); *H04N 7/15* (2013.01); *H04R 5/027* (2013.01); *H04R 5/04* (2013.01); *H04S 2400/11* (2013.01)

(58) Field of Classification Search
CPC .. H04R 5/04; H04R 5/027; H04S 7/30; H04S 2400/11; H04M 3/568; H04N 7/15
(Continued)

(56) References Cited

U.S. PATENT DOCUMENTS 5,793,875 A    8/1998  Lehr et al.
8,135,143 B2 * 3/2012  Ishibashi ............... H04R 1/403
                                                  348/14.16

(Continued)

FOREIGN PATENT DOCUMENTS

EP          1 206 161 A1    5/2002
WO    WO 2006/006935 A1    1/2006
WO    WO 2009/109217 A1    9/2009

OTHER PUBLICATIONS

D.R.F. Irvine, V. N. Park and L. McCormick, "Mechanisms Underlying the Sensitivity of Neurons in the Lateral Superior Olive to Interaural Intensity Differences," Department of Psychology, Monash University, Australia. Journal of Neurophysiology, 2001 (pp. 2647-2666; and Fig. 1).

(Continued)

*Primary Examiner* — William A Jerez Lora
(74) *Attorney, Agent, or Firm* — Brinks Gilson & Lione

(57) ABSTRACT

A system enhances spatialization in an audio signal at a receiving location. The system applies a phase difference analysis to signals received from an array of spaced apart input devices that convert sound into electrical signals. The system derives spatial or directional information about the relative locations of the sound sources. The converted signals may be mixed using weights derived from the spatial information to generate a multichannel output signal that, when processed by a remote or local audio system, generates a representation of the relative locations of the sound sources at the originating location at the receiving location.

34 Claims, 5 Drawing Sheets

Related U.S. Application Data

(60) Provisional application No. 61/301,745, filed on Feb. 5, 2010, provisional application No. 61/301,761, filed on Feb. 5, 2010.

(51) Int. Cl.
  *H04M 3/56* (2006.01)
  *H04N 7/15* (2006.01)
  *H04R 5/027* (2006.01)
  *H04R 5/04* (2006.01)

(58) Field of Classification Search
  USPC .......... 381/17, 26, 74, 92, 91, 119; 367/124, 367/125
  See application file for complete search history.

(56) References Cited

U.S. PATENT DOCUMENTS

| | | | |
|---|---|---|---|
| 8,379,868 B2* | 2/2013 | Goodwin | G10L 19/008 381/17 |
| 2003/0048760 A1* | 3/2003 | Park | H04B 7/0617 370/295 |
| 2003/0051532 A1 | 3/2003 | Beaucoup et al. | |
| 2004/0032487 A1 | 2/2004 | Chu et al. | |
| 2004/0076301 A1 | 4/2004 | Algazi et al. | |
| 2006/0239471 A1 | 10/2006 | Mao et al. | |
| 2006/0245601 A1 | 11/2006 | Michaud et al. | |
| 2007/0116297 A1* | 5/2007 | Mishra | H04S 3/00 381/77 |
| 2007/0269063 A1* | 11/2007 | Goodwin | G10L 19/008 381/310 |
| 2008/0165993 A1 | 7/2008 | Cho | |
| 2008/0228501 A1* | 9/2008 | Pang | G10L 19/008 704/500 |
| 2008/0232617 A1* | 9/2008 | Goodwin | G10L 19/008 381/307 |
| 2008/0247274 A1 | 10/2008 | Seltzer et al. | |
| 2008/0285824 A1 | 11/2008 | Wildes et al. | |
| 2008/0298610 A1 | 12/2008 | Virolainen et al. | |
| 2009/0052688 A1* | 2/2009 | Ishibashi | H04R 1/403 381/92 |
| 2009/0060222 A1 | 3/2009 | Jeong et al. | |
| 2009/0141908 A1 | 6/2009 | Jeong et al. | |
| 2009/0226005 A1 | 9/2009 | Acero et al. | |
| 2009/0238377 A1 | 9/2009 | Ramakrishnan et al. | |
| 2009/0252356 A1 | 10/2009 | Goodwin et al. | |
| 2009/0323981 A1 | 12/2009 | Cutler | |
| 2010/0110834 A1 | 5/2010 | Kim et al. | |
| 2010/0260356 A1* | 10/2010 | Teramoto | H04S 3/002 381/120 |
| 2010/0310084 A1 | 12/2010 | Hersbach | |
| 2011/0002469 A1 | 1/2011 | Ojala | |
| 2012/0093339 A1 | 4/2012 | Wu | |
| 2013/0093831 A1 | 4/2013 | Cutler | |

OTHER PUBLICATIONS

Extended European Search Report dated May 13, 2011, for corresponding European Application No. 11 153 430.1 (7 pages).

Extended European Search Report dated May 16, 2011, for corresponding European Application No. 11 153 433.5 (8 pages).

European Search Report dated Mar. 19, 2012, for corresponding European Application No. 11 153 430.1-2225 (7 pages).

Communication from the European Patent Office re Intent to Grant dated Jun. 13, 2013, for corresponding European Application No. 11 153 430.1 (11 pages).

Office Action dated Jul. 5, 2016, from corresponding U.S. Appl. No. 14/571,896 (8 pgs.).

Office Acton dated Nov. 30, 2016 from corresponding U.S. Appl. No. 14/571,896 (8 pgs.).

* cited by examiner

ENHANCED SPATIALIZATION SYSTEM

PRIORITY CLAIM

The present patent document is a continuation of application Ser. No. 13/020,954, filed Feb. 4, 2011, now U.S. Pat. No. 9,036,843, which claims priority from U.S. Provisional Applications Nos. 61/301,745 and 61/301,761, both of which were filed on Feb. 5, 2010, which are incorporated by reference.

BACKGROUND OF THE INVENTION

Technical Field

This disclosure relates to the field of multichannel communications. In particular, to a system that enhances spatialization.

Related Art

Some voice communication has been carried out over a single audio channel and often over a narrow band of the audio spectrum, between 200 Hz and 3500 Hz. This has lead to a situation where voice communications have become a necessity but are rarely enjoyable and in some cases are actually difficult to understand. When the voice communication is paired with a video feed (i.e., in a video conferencing system) the low quality voice communication can significantly degrade the overall user experience.

Some video conferencing systems alternatively can use a single microphone or an array of microphones. In the single microphone system the voices of all speakers will be mixed equally, assuming an equal signal level at the microphone, into a single mono output. In the multiple microphone system, the microphone signals can be mixed to produce a single mono output or, alternatively two or more microphone signals can be mixed to produce a simple stereo output (i.e., a left microphone is mixed to the left channel and vice versa).

The spatial information (e.g., the relative physical positions of the speakers) is neither well represented in the output signal nor presented at the other end of the video conference. This can be confusing or annoying for participants at the other end as the voices coming out of loudspeakers do not have a spatial layout that corresponds to the apparent positions of the speakers on the video display device.

SUMMARY

A system enhances spatialization in which spatial information about sound sources at an originating location is encoded in an audio signal. The system applies a phase difference analysis to the signals received from an array of spaced apart input devices or microphones to derive spatial or directional information about the relative locations of the sound sources. The signals from the input array or array of microphones may be mixed using weights derived from the spatial information to generate a multichannel output signal that, when processed at the receiving location, provides a representation of the relative locations of the sound sources at the originating location.

Other systems, methods, features and advantages will be, or will become, apparent to one with skill in the art upon examination of the following figures and detailed description. It is intended that all such additional systems, methods, features and advantages be included with this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

A system enhances spatialization among a plurality of directional or omnidirectional input devices that may operate in tandem to convert sound into analog signals or digital data. The hardware and software convert and transmit voiced and unvoiced input across a wireless (e.g., radio, microwave, etc.) or physical medium to a system that enables a Signal-to-Noise Ratio (SNR) and spatial scalability. The spatial information about the relative location of the sound sources may be identified, mixed, and routed into one, two, or more audio or multimedia channels. A transmitter may electrically encode the digital channel data or analog channel signals that may be transmitted through the wireless or fixed medium to a multi-dimensional output system. The output system may decode the transmitted signals through a receiver to derive a two or more dimensional separation between the directional or omnidirectional inputs to reproduce the relative locations of the originating sound sources. The outputs may emulate an original directionality about the relative locations or, alternatively, may be scaled to exploit the separation between those signals.

Figure 1:
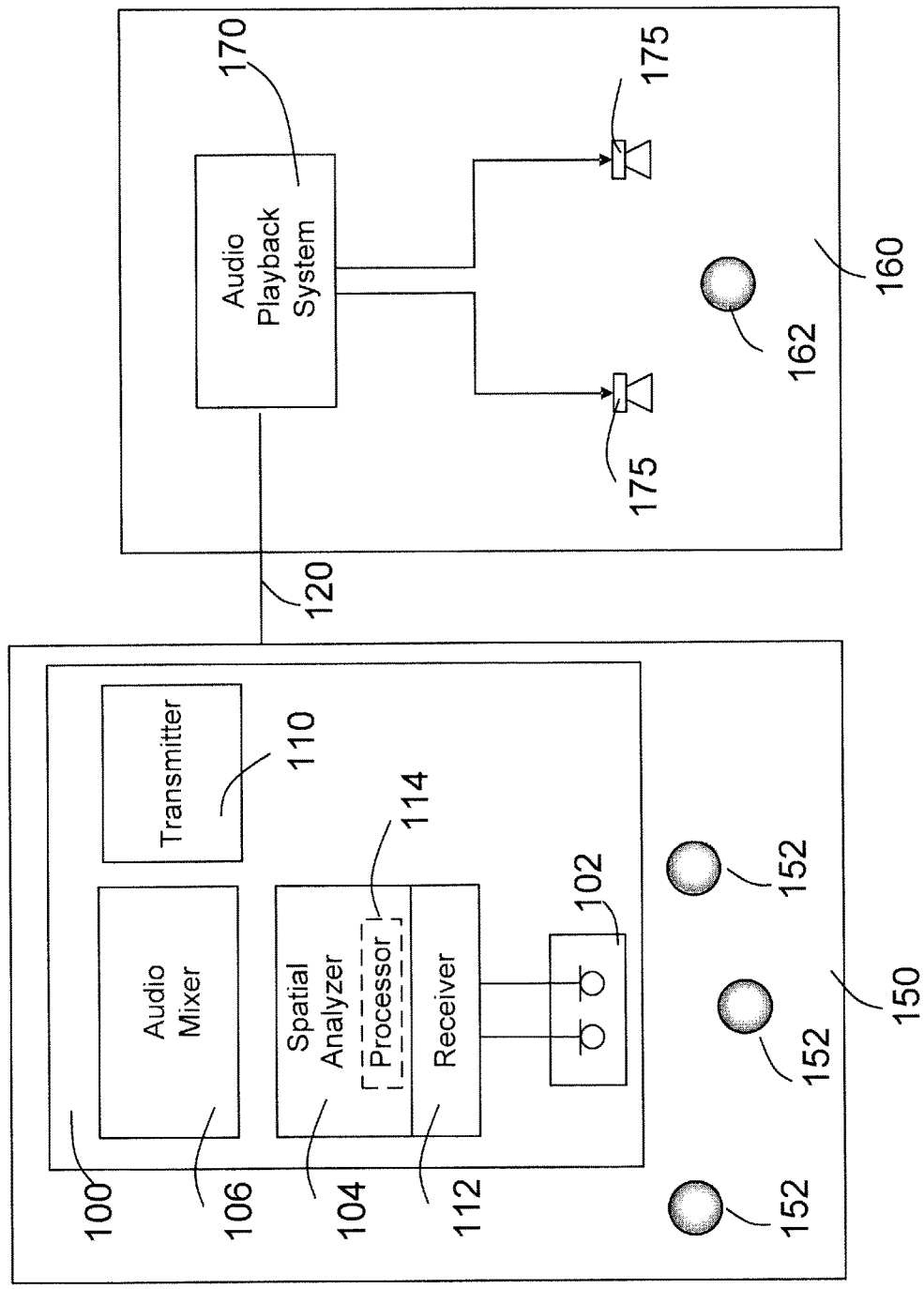
FIG. 1 is a system that enhances spatialization.
Figure 3:
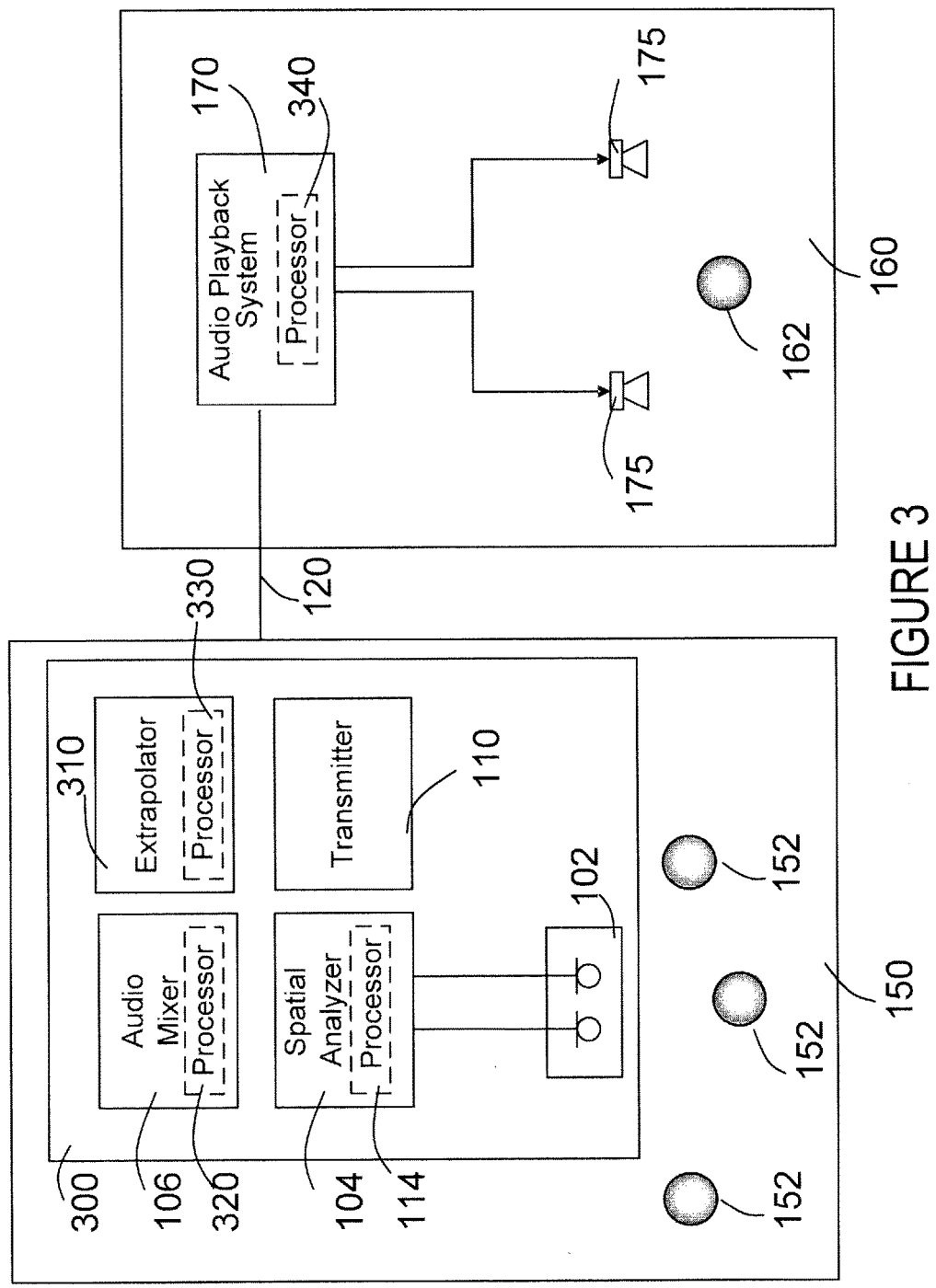
FIG. 3 is a second system that enhances spatialization.

FIG. 1 is a schematic of a system 100 that enhances spatialization. The system 100 may be positioned at an originating location 150 in a communication arrangement such as, for example, a teleconferencing or video conferencing room, an interior of a vehicle (e.g., FIG. 3), or any other area or enclosure in which there are one or more speakers 152 (or other sound sources). The system 100 may comprise two or more standalone input devices or an array of devices or sensors that convert sound into continuous or discrete data such as a microphone array 102 that may couple a receiver 112, spatial analyzer 104 and an audio mixer 106. The microphone array 102 may, for example, comprise a pair of closely spaced omni-directional microphones. The spatial analyzer 104 may receive signals from each of the microphones in the microphone array 102 directly or indirectly through a decoder or converter that converts the received signals back to their original form. The microphone signals (e.g., that may be processed through one, two, or more channels) are analyzed to derive spatial information representing the locations of each speaker 152 relative to the microphone array 102. The signals may then be combined, routed, and further processed to change the level, timbre, and/or dynamics of the signals. An electronic device, such as a transmitter 110 may encode the signals that may then be conveyed or radiated through a transmission media to another location. In some systems the transmitter 110 conveys signals through frequency modulation, amplitude modulation, or any wireless communication protocol such as cellular (e.g., Code Division Multiple Access (CDMA), Global System for Mobile Communication (GSM), etc.), Bluetooth, WLAN, WiFi, Hyper/LAN, Ultraband, WiMax, Mobile-Fi, or ZigBee mobility.

Figure 2:
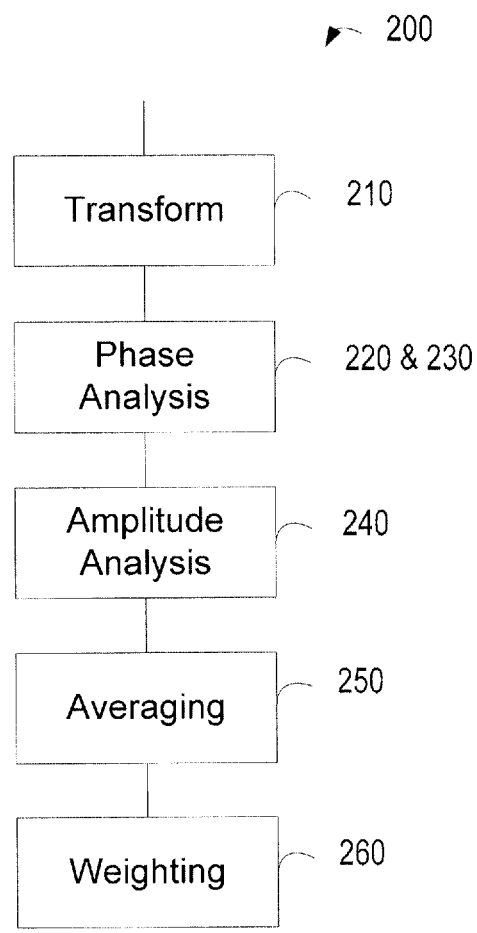
FIG. 2 is a spatial analysis process.

The spatial information that characterizes the input signals may be derived through the spatial analyzer 104 that may execute or may be configured to render the functions of a spatial analysis process such as the spatial analysis process 200 shown in FIG. 2. The analysis of the microphone signals may include hardware and/or software that transform each or selected temporal signals into the frequency domain at act 210, compute a phase for each signal over a range of frequencies at 220, and calculate a phase difference between the signals at 230. The phase difference between the pair of signals may be converted into an angle (e.g., sine and cosine values) that may be processed to rotate the first signal into phase with a second signal and vice versa. An amplitude ratio may be computed from the rotated first signal and the second signal at 240 that may be averaged over a range of frequencies at 250 by execution of the software or an averaging circuit. An averaged amplitude ratio may be computed from the first signal and the rotated second signal at 250. The averaged amplitude ratios may be converted into multipliers. The results of the analysis may derive sets of fading weights at 260. Each set of fading weights may include weights for mixing corresponding microphone signals into each channel of a multichannel output signal 120. The mixer 106 mixes the microphone signals in accordance with the sets of fading weights to generate the multichannel output signal 120. The mixer 106 may further process the microphone signals to change the level of timber and/or dynamics of the audio signal.

Figure 4:
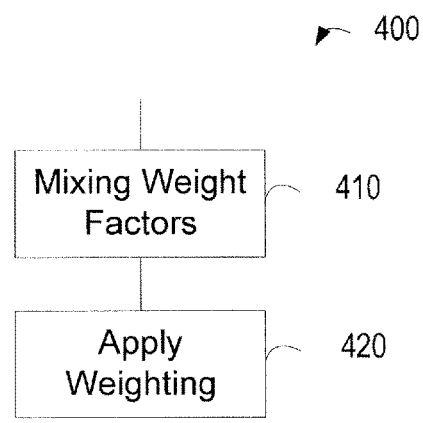
FIG. 4 is an antialiasing process.

To minimize the impact from spatial aliasing, an extrapolator 310 (shown in FIG. 3) may infer or estimate the weighting to be applied outside of an analysis region in an alternative system 300. The extrapolator 310 may emulate an antialiasing filter or may execute software that renders the output similar to an outcome of an antialiasing process such as the antialiasing process 400 shown in FIG. 4. The antialiasing process 400 may calculate or receive the average mixing weight factors for each channel within the analysis region at 410. The weighting factors are then applied to the frequencies outside the analysis region using a (SNR) based application at 420. In one application, the SNR value used to calculate a scale factor is multiplied by the mixing weight to arrive at the adjusted mixing weight for that frequency bin. Some antialiasing processes may roll-off and/or blend one or more channels to a noise level or below a noise level. The attenuation and/or blending may occur below a predetermined low frequency or first threshold and/or above a predetermined high frequency or second threshold. The high and low frequency thresholds may be empirically measured or quantitatively derived based on the desired frequency range of the system, the operating characteristics of the microphone array 102, and/or the acoustic characteristics of the receiving location 160.

In some systems 300 the analysis region is established by upper and lower limits. The lower limit may be established by the operating performance of the microphones that comprise the microphone array 102. The upper limit may be established by the distance between the microphones (that comprise the microphone array 102) and the wavelength of the desired sound. The upper frequency limit of the analysis region may be determined by the ability of the microphone array 102 to discriminate individual frequencies based on the sequential microphone spacing. For example, if the individual microphones are separated by about 4 cm, the highest frequency some systems may analyze without aliasing may occur at around 4200 Hz. The lower frequency limit, in this exemplary system, may be limited by the inherent uncertainty in the phase of the microphones. Through an empirical analysis of microphones spaced about 1 cm apart, it was confirmed that sound resonating at or below 1000 Hz is unreliable in some systems. In this exemplary system, the analysis region is spatially constrained between about 1 k Hz to 4.2 k Hz.

The system 100 may process the voices of far-field, relative to the microphone array 102, speakers 152 (or other sound sources). The analysis of the microphone signals may be directed to or limited to the high frequency components of the signals. The analysis may derive a phase vector associated with each speaker 152. The phase vector may be processed to derive the set of fading weights for each signal (or selected signals). The set of fading weights may be applied to some or the entire frequency range of each signal. The analysis of the microphone signals may include a time averaging or integrating component to mitigate short-term fluctuations in the sets of mixing weights. The analysis of the microphone signals may be a continuous or an asynchronous process that adapts and stores the set of mixing weights in memory over time in response to, for example, a speaker 152 moving around or changing positions in the originating location 150, or upon an occurrence of an event, such as a pause in a detected speech.

The output signal 120 may be transmitted through a wireless or tangible medium to a local or remote receiving location 160 where an audio or multimedia playback system 170 converts them into perceptible forms. In FIG. 1 the audio playback system 170 may convert the output signal 120 into aural signals near one or more listeners 162 through two or more output devices such as loudspeakers 175. The listeners 162 may perceive the spatial information, derived from the relative positions of the speakers, in the output of the loudspeakers 175. The voices of each speaker 152 may be perceived to come from a direction (e.g., through two, three, or more dimensions or coordinate directions such as a left, a right, etc., direction) in the receiving location 160 that is related to their relative positions in the originating location 150. The listeners 162 may experience a higher quality fidelity (e.g., an enhanced spatialization) in which they are able to associate or perceive a relative spatial location with each of the speakers' 152 voices, which may enhance intelligibility.

The system 100 may be used at a common or local location (e.g., the originating location 150) of a communication arrangement with two or more locations, or alternatively may be distributed across some or all remote participating locations in a communication arrangement or a communication network. To render the spatial information contained in an aural or multimedia output signal 120 from another location (e.g., an originating location 150) each terminating location (e.g., each receiving location 160) may tangibly or intangibly interface one or more multichannel playback system 170 that interface or couple a plurality of output devices such as loudspeakers 175.

The system 100 may include, for example, a two or more channel (e.g., stereo) configuration in which an input interface from an audio processing device, such as an audio mixer 106 may receive and decode two (e.g., a left and a right channel) or more channels. The audio playback system 170 processes the stereo output signal and transmits the content through the two or more loudspeakers 175 to render a more natural sound distribution.

The methods or functionalities that enable the systems 100 and 300 may be implemented in software retained in a computer readable medium that may be executed by a processor (e.g., system or front end processors: 114, 320, and/or 330; receiving location processor 340). The systems, methods, and descriptions described may be programmed in one or more controllers, devices, processors (e.g., signal processors). The processors may comprise one or more central processing units that supervise the sequence of micro-operations that execute the instruction code and data coming from memory (e.g., computer readable medium) that generate, support, and/or complete an operation, compression, or signal modifications. In some systems, the system or front end processors 114, 320, and 330 or front end processors 114 and 330 may comprise a single processor that interfaces with, is an integrated part, or a unitary part of the spatial analyzer 104.

Figure 5:
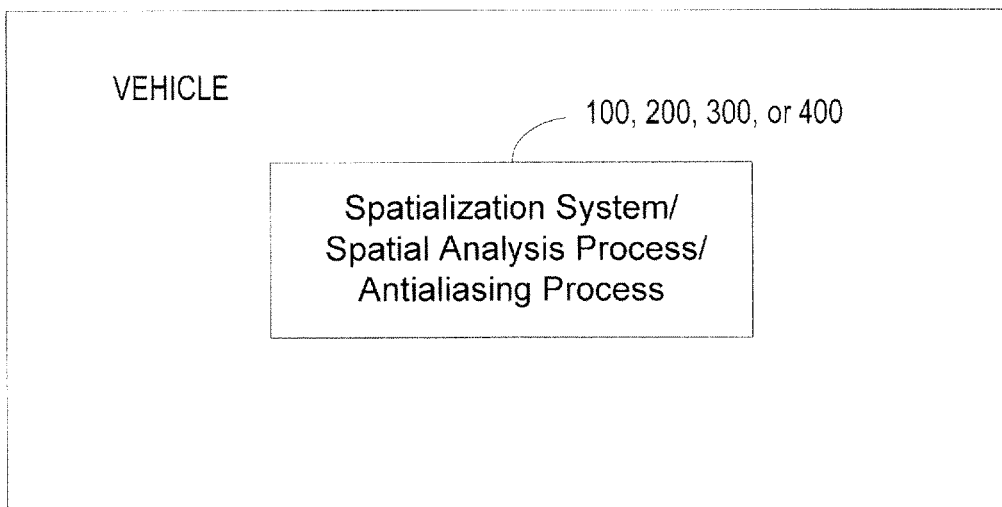
FIG. 5 is a block diagram of the spatialization system or spatialization process within a vehicle.
Figure 6:
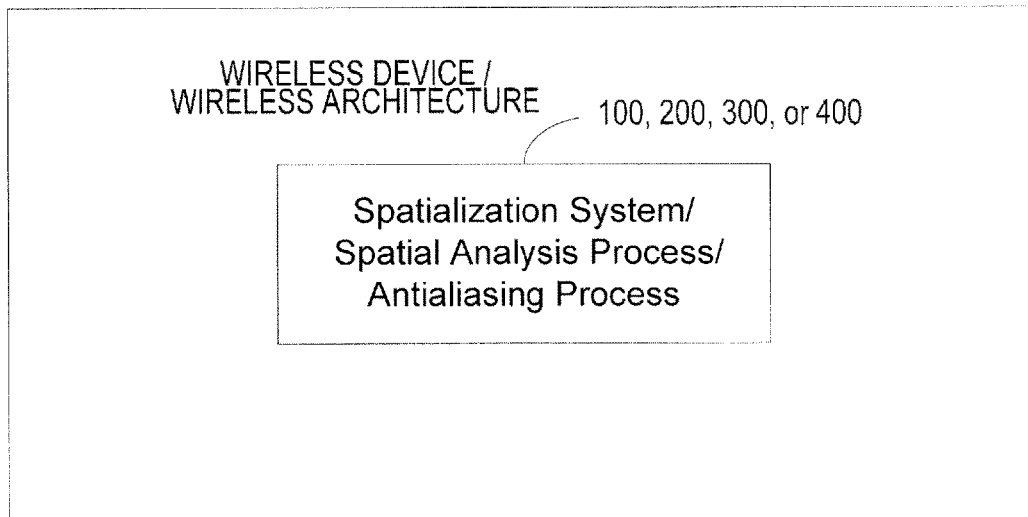
FIG. 6 is a block diagram of the spatialization system or spatialization process within a wireless device or as part of a wireless architecture.

The dedicated applications may support and define the functions of the special purpose processor or general purpose processor that is customized by instruction code (and in some applications may be resident to vehicles (e.g., FIG. 5), communication systems, audio systems, telephones, teleconferencing systems, fixed or mobile wireless devices, interface an in-vehicle bus, interface a universal serial bus (or buses having a bandwidth of about 1.5 megabits per second or greater), or interface cables such as audio or multimedia cables. Some or all of the components of the system 100 and/or some or all of the acts of the spatial analysis process 400 may be integrated within or comprise a unitary part of a wireless device such as a smart phone, portable computer, personal mobile computer, a touch screen based device (e.g., Tablet Computers), or comprise part of a wireless architecture, (e.g., FIG. 6) etc.). In some systems, a front-end processor may perform the complementary tasks of gathering data for a processor or program to work with, and for making the data and results available to other processors, controllers, or devices.

The systems, methods, and descriptions may program one or more signal processors (e.g., system or front end processors: 114, 320, and/or 330; receiving location processor 340) or may be encoded in a signal bearing storage medium, a computer-readable medium, or may comprise logic stored in a memory that may be accessible through an interface and is executable by one or more processors. Some signal-bearing storage medium or computer-readable medium comprise a memory that is unitary or separate (e.g., local or remote) from a device, programmed within a device, such as one or more integrated circuits, or retained in memory and/or processed by a controller or a computer. If the descriptions or methods are performed by software, the software or logic may reside in an electronic or optical memory resident to or interfaced to one or more processors, devices, or controllers that may support a tangible or visual communication interface (e.g., to a display), wireless communication interface, or a wireless system.

The memory may retain an ordered listing of executable instructions in a processor, device, or controller accessible medium for implementing logical functions. A logical function may be implemented through digital circuitry, through source code, or through analog circuitry. The software may be embodied in any computer-readable medium, signal-bearing medium, or other non-transitory medium for use by, or in connection with, an instruction executable system, apparatus, and device, resident to system that may maintain persistent or non-persistent connections. Such a system may include a computer system, a processor-based system, or another system that includes an input and output interface that may communicate with a publicly accessible or privately accessible distributed network through a wireless or tangible communication bus through a public and/or proprietary protocol.

A "computer-readable storage medium," "machine-readable medium," "propagated-signal" medium, and/or "signal-bearing medium" may comprise a medium (e.g., a non-transitory medium) that stores, communicates, propagates, or transports software or data for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory, such as a Random Access Memory (RAM), a Read-Only Memory (ROM), an Erasable Programmable Read-Only Memory (EPROM or Flash memory), or an optical fiber. A machine-readable medium may also include a tangible medium, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the present invention. Accordingly, the invention is not to be restricted except in light of the attached claims and their equivalents.

What is claimed is:

1. A system that enhances spatialization, comprising:
a receiver that processes incoming signals received from a plurality of input devices that convert sound into electrical signals;
a processor that executes a non-transitory computer readable storage medium comprising:
computer program code that derives from the received incoming signals spatial information comprising locations of each of one or more sound sources relative to the plurality of input devices by computing over a range of frequencies an amplitude ratio for a first received signal rotated into phase with a second received signal, and computing from the amplitude ratio over the range of frequencies an average amplitude ratio; and
computer program code that derives from the average amplitude ratio a set of fading weights used for mixing the received incoming signals into each channel of a multichannel output signal to emulate at a receiving location, spatial information representing locations of each of the sound sources relative to the plurality of input devices.

2. The system of claim 1, where the multichannel output signal emulates spatial information representing locations of each of the sound sources in two or more dimensions.

3. The system of claim 1, where the received incoming signals comprise discrete signals.

4. The system of claim 1, where the received incoming signals comprise continuous signals.

5. The system of claim 1, further comprising computer program code that reduces spatial aliasing by estimating the set of fading weights to be applied outside of an analysis region.

6. The system of claim 5, where the analysis region is partially limited by an operating performance of the plurality of input devices and a wavelength of a desired sound.

7. A system that enhances spatialization, comprising:
a plurality of input devices that convert sound from originating sound sources into electrical signals;
a receiver that processes incoming signals received from the plurality of input devices;
a spatial analyzer configured to derive spatial information representing locations of each of the originating sound sources relative to the plurality of input devices by deriving a phase vector associated with each of the originating sound sources, and process each phase vector to derive a set of fading weights used in mixing the received incoming signals into each channel of a multichannel output signal to emulate, when processed by a remote or local audio system, spatial information representing locations of each of the originating sound sources relative to the plurality of input devices; and
an extrapolator that emulates an antialiasing filter by estimating the set of fading weights to be applied outside of an analysis region, where the set of fading weights to be applied outside of the analysis region is adjusted by a scale factor derived from a signal-to-noise ratio (SNR) value.

8. The system of claim 7, further comprising a mixer configured to mix the received incoming signals input-into a plurality of audio channels of the multichannel output signal.

9. The system of claim 7, where the spatial analyzer is further configured to transform selected temporal signals into a frequency domain.

10. The system of claim 7, where the set of fading weights comprise a plurality of fading weights for mixing the received incoming signals into one or more channels of a multichannel output signal.

11. The system of claim 7, where the analysis region is partially limited by the operating performance of two or more microphones that comprise the plurality of input devices.

12. The system of claim 11, where the analysis region is partially limited by the distance between the two or more microphones that comprise the plurality of input devices and a wavelength of a desired sound.

13. The system of claim 8, further comprising a transmitter that encodes and transmits an output of the mixer to the remote or local audio system.

14. The system of claim 7, where the spatial analyzer is further configured to derive the phase vector from high frequency components of the received incoming signals.

15. The system of claim 7, where the multichannel output signal emulates spatial information representing locations of each of the originating sound sources in two or more dimensions.

16. The system of claim 7, where the set of fading weights vary over time.

17. A method that enhances spatialization, comprising:
analyzing incoming signals received at a plurality of input devices from one or more originating sound sources to derive spatial information representing a location of each of one or more of the originating sound sources relative to the plurality of input devices, and to derive a set of fading weights from average amplitude ratios of the received incoming signals computed over a range of frequencies; and
mixing the received incoming signals, using the set of fading weights, into each channel of a multichannel output signal to emulate, when processed by a receiving audio system, a perceived sound at a receiving location from a direction related to a relative position of each of the one or more originating sound source at an originating location.

18. The method of claim 17, further comprising transmitting the multichannel output signal from the originating location to the receiving audio system at a remote location.

19. The method of claim 17, further comprising emulating an antialiasing filter by estimating the set of fading weights to be applied outside an analysis region.

20. The method of claim 19, where the analysis region is bounded by characteristics of two or more microphones that comprise the plurality of input devices and a wavelength of a desired sound.

21. The method of claim 20, where the analysis region is further bounded by a distance between the two or more microphones.

22. The method of claim 17, where the multichannel output signal emulates spatial information representing locations of each of the originating sound sources in two or more dimensions.

23. A non-transitory computer readable medium storing instructions to execute spatialization enhancement, comprising:
deriving from received incoming signals spatial information comprising locations of each of one or more sound sources relative to a plurality of input devices by computing over a range of frequencies an amplitude ratio for a first received signal rotated into phase with a second received signal, and computing from the amplitude ratio over the range of frequencies an average amplitude ratio; and
deriving from the average amplitude ratio a set of fading weights used for mixing the received incoming signals into each channel of a multichannel output signal to emulate at a receiving location, spatial information representing locations of each of the sound sources relative to the plurality of input devices.

24. The non-transitory computer readable medium of claim 23, where the multichannel output signal emulates spatial information representing locations of each of the sound sources in two or more dimensions.

25. The non-transitory computer readable medium of claim 23, where the received incoming signals comprise discrete signals.

26. The non-transitory computer readable medium of claim 23, where the received signals comprise continuous signals.

27. The non-transitory computer readable medium of claim 23, further comprising reducing spatial aliasing by estimating the set of fading weights to be applied outside of an analysis region.

28. The non-transitory computer readable medium of claim 27, where the analysis region is partially limited by an operating performance of the plurality of input devices and a wavelength of a desired sound.

29. A non-transitory computer readable medium storing instructions to execute spatialization enhancement, comprising:
analyzing incoming signals received at a plurality of input devices from one or more originating sound sources to derive spatial information representing a location of each of one or more of the originating sound sources relative to the plurality of input devices, and to derive a set of fading weights from average amplitude ratios of the received incoming signals computed over a range of frequencies; and mixing the received incoming signals, using the set of fading weights, into each channel of a multichannel output signal to emulate, when processed by a receiving audio system, a perceived sound at a receiving location from a direction related to a relative position of each of the one or more originating sound source at an originating location.

30. The non-transitory computer readable medium of claim 29, further comprising transmitting the multichannel output signal from the originating location to the receiving audio system at a remote location.

31. The non-transitory computer readable medium of claim 29, further comprising emulating an antialiasing filter by estimating the set of fading weights to be applied outside an analysis region.

32. The non-transitory computer readable medium of claim 31, where the analysis region is bounded by characteristics of two or more microphones that comprise the plurality of input devices and a wavelength of a desired sound.

33. The non-transitory computer readable medium of claim 32, where the analysis region is further bounded by a distance between the two or more microphones.

34. The non-transitory computer readable medium of claim 29, where the multichannel output signal emulates spatial information representing locations of each of the originating sound sources is two or more dimensions.

* * * * *

UNITED STATES PATENT AND TRADEMARK OFFICE
CERTIFICATE OF CORRECTION

Page 1 of 1

PATENT NO.         : 9,736,611 B2
APPLICATION NO.    : 14/689558
DATED              : August 15, 2017
INVENTOR(S)        : Phillip A. Hetherington et al.

It is certified that error appears in the above-identified patent and that said Letters Patent is hereby corrected as shown below:

In the Claims

In Column 7, Claim 8, Line 27, after "the received incoming signals" delete "input".

Signed and Sealed this
First Day of May, 2018

Andrei Iancu
*Director of the United States Patent and Trademark Office*